Oct. 4, 1927.
R. TIEDEMANN
1,644,454
BEARING AND DIRECTION INDICATOR WITH SECTION MAP FOR VEHICLES
Filed Oct. 4, 1926　　　2 Sheets-Sheet 1
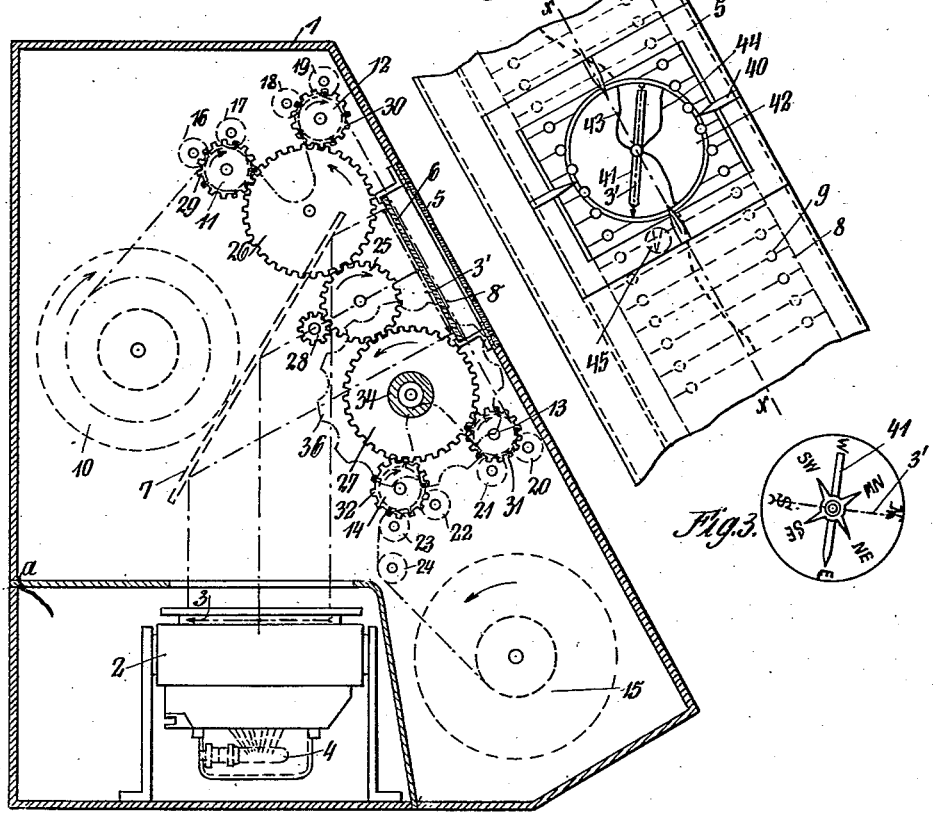
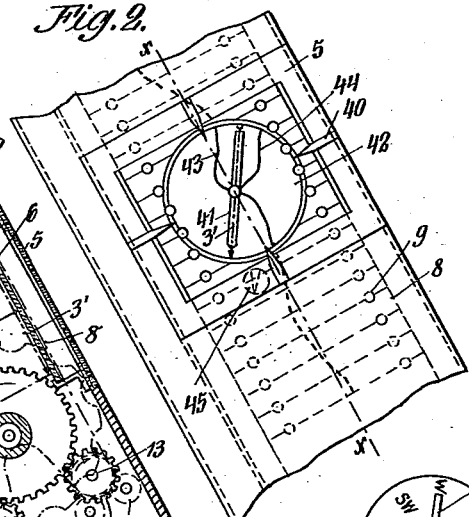
Inventor:
Robert Tiedemann
by
Attorney.

Oct. 4, 1927.
R. TIEDEMANN
1,644,454
BEARING AND DIRECTION INDICATOR WITH SECTION MAP FOR VEHICLES
Filed Oct. 4, 1926    2 Sheets-Sheet 2
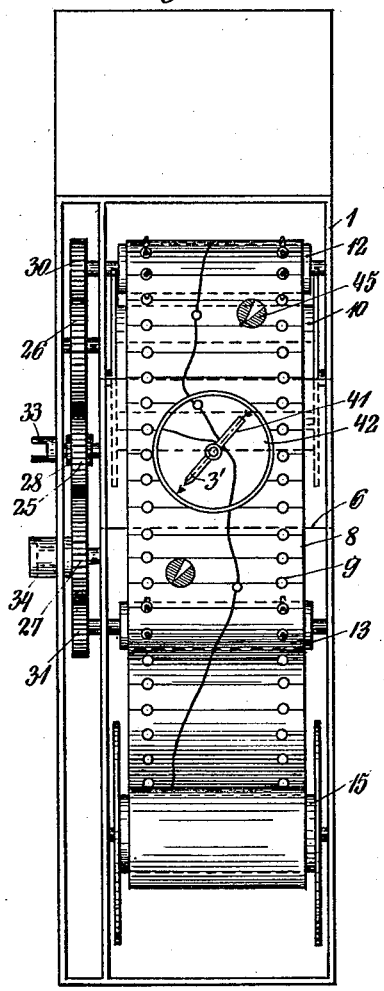
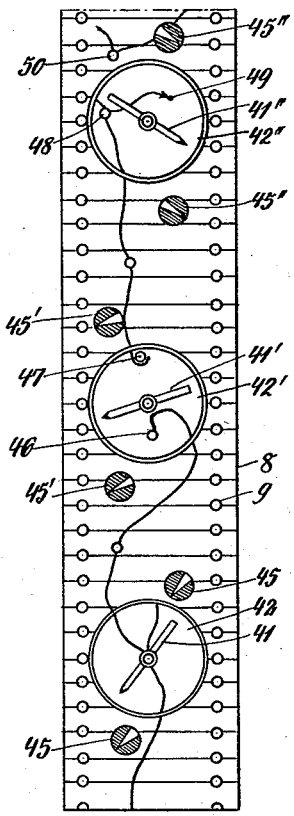
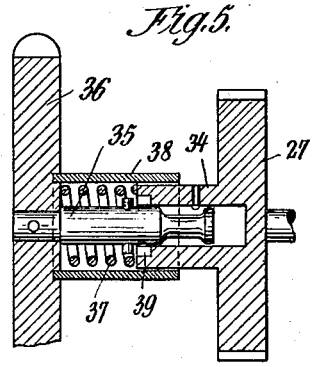
Inventor:
Robert Tiedemann
by
Attorney.

Patented Oct. 4, 1927.

1,644,454

UNITED STATES PATENT OFFICE.

ROBERT TIEDEMANN, OF MUNICH, GERMANY.

BEARING AND DIRECTION INDICATOR WITH SECTION MAP FOR VEHICLES.

Application filed October 4, 1926, Serial No. 139,506, and in Germany May 13, 1925.

This invention relates to an indicator for bearings and direction which makes it possible for the driver to know from section to section whether he has driven in the right direction, and which induces the driver, when he observes the indicator, to steer the vehicle at branch roads into the correct direction. According to the invention the rhumb-card is marked on the section map at the road crossings this rhumb-card comprising a hand which indicates the position which the compass-needle must adopt at the point in question at the correct direction of travel of the vehicle, the rhumb-card of the compass being further projected upon the section map in such a manner that it registers each time with the rhumb-card marked on the section map in question. If in this case the hand marked on the map and the projected compass needle register, the vehicle is running in the correct direction. If they do not register the vehicle has to be turned at the point in question until the hand and the compass needle register. Special signalling signs on the section map call attention to branch roads and to rhumb-cards which are ahead of the car, and the section map comprises further special representations of side or back turns on the road.

An embodiment of the invention is shown, by way of example, in the accompanying drawings in which:—

Fig. 1 shows an elevation of the apparatus viewed from the left side, the side wall of the casing being removed.

Fig. 2 shows in plan view the window point.

Fig. 3 shows in plan view how travelling in a wrong direction is indicated.

Fig. 4 is a front elevation of the apparatus, the top plate of the casing being removed.

Fig. 5 shows one handle in section.

Fig. 6 shows in plan view a portion of the section map.

In a casing 1 closed on all sides (Fig. 1) a fluid compass 2 is fixed in a separate chamber $a$, said fluid compass being accurately compensated for the car and for the point at which it is mounted, the rhumb-card of this compass being rotatable together with the needle 3 and lighted from below by a lamp 4. The compartment $a$ of the casing is enclosed by walls $b$, the remaining portion of the casing being placed upon this compartment. The compass is suspended in its box so that it can oscillate around a pivot pin in order to adjust itself into the horizontal position, the lamp 4 is, however, stationary. At a suitable point a window 5 is arranged in the inclined front wall of the casing, a glass pane being arranged underneath this window. In the casing a mirror 7 is mounted in such position that the compass needle 3 is visible through the window 5. The section map 8 is made of transparent material and it has, like a film band, perforations 9 along the side edges to be conveyed by a spool 10 over pin cylinders 11, 12, 13, 14 underneath the window 5 to the spool 15. 16 to 24 are guide pulleys. Spur wheels 25, 26 and 27 serve to transmit a driving movement of the driving pinion 28 upon spur wheels 29, 30, 31 and 32 keyed on the axles of the pin cylinders 11, 12, 13 and 14. Between the catch cylinders 12 and 13 the section map 8 is conducted underneath the window 5 in front of the glass pane 6 through which the rhumb-card 3 is visible. The axle of the driving pinion 28 carries a claw 33 by means of which this axle is coupled to a flexible shaft fixed to a wheel of the car or to the driving shaft of the engine to move the section map 8 in accordance with the speed of the car. By providing several driving pinions 28 and axles, each pinion engaging with the pinion 25 at another ratio of transmission the flexible shaft can be coupled with the axle which corresponds to the scale of the section map which is actually used. On the pinion 27 an outwardly projecting sleeve 34 is mounted. A stud 35 (Fig. 5) of a hand wheel 36 is rotatable and slidable in the bore of said sleeve 34 and cooperates with said sleeve to form a clutch between the pinion 27 and hand wheel 36. The hand wheel 36 has a sleeve 38 in which a spiral spring 37 is located. By pressing the hand wheel 36 towards the pinion 28 in overcoming the pressure of the spring 37 the stud 35 of the hand wheel is brought into clutching engagement with notches 39 of sleeve 34 so that the pinion 27 (or eventually the pinion 26) can be adjusted by the hand wheel in case the visible portion of the section map should not coincide accurately to the actual position of the car. Indicating lines 40 (Fig. 4) on the window 5 indicate on the section map the point at which the car is standing or ought to stand. The section map 8 is guided under the window 5 so that the central line $x$—$x$ (Fig. 2) of the strip of map extends permanently through the projected center of the rhumb-card and of the compass needle 3'. In this central line $x$—$x$ of the strip the center of the rhumb card 42 marked on the strip and having a hand 41 is also situated so that, when the car is running over the point which corresponds to the center of the position of the hand 41 marked on the map, the projected picture of the compass needle 3' must perfectly register with the drawn hand 41 of the rhumb-card, as indicated on Fig. 2.

The direction in which the car is running is indicated by the central line $x$—$x$ of the section map which is parallel to the longitudinal axis of the car if the apparatus is correctly mounted on the car. If the projected picture shown in Fig. 3 were visible in the window this would indicate to the driver that he is travelling in a wrong direction. The projected compass needle 3' indicates in this case the north direction at the right hand side of the direction of travel $x$—$x$ whilst it ought to be at the left hand side, according to the hand 41 marked on the rhumb card. The driver must therefore turn into the road 43 at the left and leave the road 44 (Fig. 2) on which he is driving at the left, and continuing to drive on road 43.

The hand 41 marked on the map is preferably red, the compass needle 3 green, so that the position of the two hands is clearly visible.

The strip 8 of the section map (Fig. 6) has at all road crossings a rhumb card 42, 42', 42'' with a hand 41, 41', 41'' marked upon it and the altered positions of the head at these points indicate the direction in which the car has to travel as, if the car is travelling on the correct road, the projected compass needle 3' must register with this altered position of the hand. In comparing the actual position of the compass needle with the altered position of the hand of the next following rhumb-card on the section map the driver will know whether at the next road crossing he must turn to the right or to the left. Shortly in front of and, as the road may be travelled also in inverse direction, shortly behind the rhumb-cards, signals 45, 45', 45'' are marked on the section map and painted, for instance green, in order that the driver's attention will be drawn in due time upon the next following rhumb card and road branching. The signal marks might also indicate the altered position of the hand on the next following rhumb-card so that the driver knows in which direction he will have to turn at the next road crossing.

In the pictures of the rhumb-cards the curves, side tracks and turnings of the road are indicated and the sections are interrupted in the rhumb-cards and marked farther in front. In the rhumb-card 42' (Fig. 6) for instance a curve of the road turning back is inserted which ends in the point 46. If the driver has driven through the curve and reached the point 46 the point 47 will be under the window at that point at which at the beginning of the curve the point 46 was situated. The interruption from point 46 to point 47 corresponds with the length of the curve.

In the rhumb-card 42'' a road turning to the side is indicated from point 48 to point 49. If the driver has driven along this side road the point 50 has got in the window to the point where the point 48 was situated at the beginning of the side road. The length 48—49 corresponds, therefore, to the interruption 48 to 50.

I claim:—

1. In a direction indicator for vehicles, a casing, a window in the casing, a transparent strip map in the casing, means operated by a moving part of the vehicle for moving the map in front of the window, a plurality of rhumb-cards on the strip map, each located a distance from the adjacent one proportional to distances between road branches, each rhumb-card having a hand thereon indicating a direction of travel, a compass in the casing, a mirror in the casing to receive the reflection of the compass needle and the needle reflection in the mirror being viewable through the transparent strip map and window in superposed relation with respect to the rhumb-cards.

2. In a direction indicator for vehicles, a strip road map operable by a movable part of the vehicle, rhumb-cards on the map arranged distances apart proportional to distances between road branches, a direction indicating hand on each rhumb-card, an illuminated compass and a mirror arranged to receive the reflection of the compass in a position to be read jointly with the rhumb-card to determine the correct direction of travel.

3. In a direction indicator for vehicles, a strip road map operable by a movable part of the vehicle, rhumb-cards on the map arranged distances apart proportioned to distances between road branches, a direction indicating hand on each rhumb-card, an illuminated compass and a mirror arranged to receive the reflection of the compass in a position to be read jointly with the rhumb-card to determine the correct direction of travel, said strip map having indicating characters thereon preceding and following the rhumb-cards to indicate the position of the indicating hand on the adjacent rhumb-card.

In testimony whereof I affix my signature.

ROBERT TIEDEMANN.